(12) United States Patent
Shin et al.

(10) Patent No.: US 10,122,872 B1
(45) Date of Patent: Nov. 6, 2018

(54) AUTOMATIC CONFIGURATION OF NETWORK DEVICES IN REMOTE MANAGED PRINT SERVICE APPLICATIONS UTILIZING GROUPS OF HISTORICAL DEVICE DATA

(71) Applicant: Xerox Corporation, Norwalk, CT (US)

(72) Inventors: Helen Haekyung Shin, Fairport, NY (US); Howard A. Mizes, Pittsford, NY (US); Peter Cech, Pittsford, NY (US); Jesse L. Allen, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/609,117

(22) Filed: May 31, 2017

(51) Int. Cl.
*G06F 3/12* (2006.01)
*H04N 1/00* (2006.01)
*H04L 12/24* (2006.01)

(52) U.S. Cl.
CPC ......... *H04N 1/00344* (2013.01); *G06F 3/123* (2013.01); *G06F 3/1203* (2013.01); *G06F 3/1236* (2013.01); *G06F 3/1286* (2013.01); *H04L 41/08* (2013.01); *H04N 1/00087* (2013.01); *H04N 1/00244* (2013.01); *H04N 2201/0094* (2013.01)

(58) Field of Classification Search
CPC . H04L 41/08; H04L 41/0803; H04N 1/00244; H04N 1/00344; H04N 2201/0094; G06F 3/1203; G06F 3/123; G06F 3/1246; G06F 3/1236

See application file for complete search history.

(56) References Cited

U.S. PATENT DOCUMENTS

| | | |
|---|---|---|
| 6,301,012 B1 | 10/2001 | White et al. |
| 6,814,510 B1 | 11/2004 | Sabbagh et al. |
| 7,978,351 B2 | 7/2011 | Ishida et al. |
| 8,498,002 B2 | 7/2013 | Iida |
| 8,570,550 B2 | 10/2013 | Pothos et al. |
| 8,713,372 B2 | 4/2014 | Tsongas et al. |
| 8,953,190 B2 | 2/2015 | Poysa et al. |
| 2005/0052660 A1 | 3/2005 | Sabbagh et al. |

(Continued)

OTHER PUBLICATIONS https://docs.python.org/2/library/xml.etree.elementtree.html. Accessed May 24, 2017. pp. 1-13.

(Continued)

*Primary Examiner* — Moustapha Diaby
(74) *Attorney, Agent, or Firm* — Gibb & Riley, LLC

(57) ABSTRACT

A device management application (DMA) contacts printing devices connected to a computer network to obtain the device type, configuration parameters, and configuration settings from the printing devices. The device type, the configuration parameters, and the configuration settings are stored for each of the printing devices in a nested hash table. The configuration settings are grouped for each of the printing devices by device type in a working file, such as an XML tree that has leaf nodes for each configuration parameter of each different device type group. These methods identify the most common configuration settings for each of the configuration parameters in the leaf nodes, and map the most common configuration settings for the configuration parameters to configuration setup files for each the device type group. The configuration setup files are then deployed to the printing devices.

20 Claims, 7 Drawing Sheets

(56) References Cited

U.S. PATENT DOCUMENTS

| | | | | |
|---|---|---|---|---|
| 2008/0068635 A1* | 3/2008 | Asano | ................... | G06F 3/1204 |
| | | | | 358/1.13 |
| 2008/0079286 A1 | 4/2008 | Ferlitsch et al. | | |
| 2008/0235260 A1* | 9/2008 | Han | ................... | G06F 17/2247 |
| 2009/0287668 A1* | 11/2009 | Evans | ................ | G06F 17/3071 |
| 2013/0332257 A1* | 12/2013 | Scheinost | .............. | G06Q 30/02 |
| | | | | 705/14.36 |
| 2015/0264198 A1* | 9/2015 | Kamiya | ............... | H04N 1/0097 |
| | | | | 358/1.13 |

OTHER PUBLICATIONS https://developer.apple.com/library/content/documentation/Cocoa/Conceptual/XMLParsing/Articles/ConstructingTrees.html. Accessed May 24, 2017. pp. 1-3.

https://www.tutorialspoint.com/xml/xml_parsers.htm. Accessed May 24, 2017. p. 1.

\* cited by examiner

AUTOMATIC CONFIGURATION OF NETWORK DEVICES IN REMOTE MANAGED PRINT SERVICE APPLICATIONS UTILIZING GROUPS OF HISTORICAL DEVICE DATA

BACKGROUND

Systems and methods herein generally relate to the automatic configuration settings for networked printing device, and more particularly to the automatic configuration of network devices in remote managed print service applications utilizing groups of historical device data.

Various devices that are linked to a network can include a network management station or device management application (DMA) and a plurality of target devices, which may be, for example, printers, plotters, digital printer, fax machines, computer workstations, file and print servers and/or networking resources and devices; such as, repeaters, switches, routers, routers hubs, concentrators, nodes, and the like. DMA and each of the target devices has a network interface and is configured to communicate with network using the Simple Network Management Protocol (SNMP).

The device management application accesses the tethered devices to obtain configuration information of the target devices. The configuration information returned to the DMA includes, for example, an IP address of the target device, parameter names and associated values for each protocol, and vendor/manufacturer and model information of the target devices. Once the IP address is obtained, the DMA sets the IP address, parameter names and associated values for each protocol, to create a software object for the device in a network agent. When the device software object is successfully created, the created object is used to obtain Vendor, Model, and Unique ID from the target devices to be stored at DMA or in database.

Once the vendor, model information, and unique ID are obtained from the device software object, the DMA updates the database with information received from the target devices. The information is used to monitor the target devices for alarm conditions, track depletion of resources, maintain a running account of resources such as print media and the like at the target device, and implement a billing strategy for the device.

The same device configuration settings can be used for a homogenous network of devices; however, such an arrangement is not tailored to fit all installations and does not allow for device differences in customer environments. The difference in devices at the customer environments causes a specific set of device configuration settings to work for some devices, but not for others. The differences in devices occur because device configurations are often maintained in different ways by different companies and within private management information databases (MIBs).

SUMMARY

Various methods herein contact printing devices connected to a computer network using a device management application (DMA) operating on a computerized device to obtain the device type (e.g., model name and number), configuration parameters, and configuration settings from the printing devices. These methods store the device type, the configuration parameters, and the configuration settings for each of the printing devices in a nested hash table (e.g., in one or more files in a memory device of the computerized device).

The configuration settings are grouped for each of the printing devices by device type in a working file, such as an XML tree that has leaf nodes for each configuration parameter of each different device type group. These methods identify the most common configuration settings for each of the configuration parameters in the leaf nodes. The most common configuration setting can be the setting for a configuration parameter that occurs most often, relative to other settings for the configuration parameter within each the device type group; or one that has been changed from a different setting most often, relative to other settings for the configuration parameter within each of the device type groups.

Also, these methods map the most common configuration settings for the configuration parameters to configuration setup files for each the device type group. This mapping process can include creating a device-specific XML tree that has leaf nodes for each configuration parameter of a specific printing device, and comparing the device-specific XML tree to the XML tree to produce common configuration parameters and uncommon configuration parameter. These methods use the common configuration parameters for the configuration setup file specific to device types matching the specific printing device.

Additionally, user input can be received to modify the configuration setup files. The configuration setup files are then deployed to the printing devices (e.g., by resetting configuration settings of the printing devices to match configuration settings in the configuration setup files, etc.).

Various systems herein include (among other components) printing devices and a computerized device connected to a computer network. The computerized device can include a memory device, and a device management application (DMA) which can be operating on the computerized device.

The DMA contacts the printing devices connected to the computer network to obtain the device type, configuration parameters, and configuration settings of the configuration parameters from the printing devices. The DMA stores the device type, the configuration parameters, and the configuration settings for each of the printing devices in a nested hash table in the memory device of the computerized device. The DMA groups the configuration settings for each of the printing devices by the device type in an extensible markup language (XML) tree that has leaf nodes for each configuration parameter of each different device type group.

The DMA identifies the most common configuration settings for each of the configuration parameters in the leaf nodes. The most common configuration setting is the setting for a configuration parameter that occurs most often, relative to other settings for the configuration parameter within each the device type group; or one that has been changed from a different setting most often, relative to the other settings for the configuration parameter within each of the device type groups.

The DMA maps the most common configuration settings for the configuration parameters to configuration setup files for each device type group by creating a device-specific XML tree that has leaf nodes for each configuration parameter of a specific printing device; and comparing the device-specific XML tree to the XML tree to produce common configuration parameters and uncommon configuration parameter. The common configuration parameters are used for a configuration setup file specific to device types matching the specific printing device.

Also, user input can be received to modify the configuration setup files. The DMA deploys the configuration setup files to the printing devices (e.g., by resetting configuration settings of the printing devices to match configuration settings in the configuration setup files, etc.).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
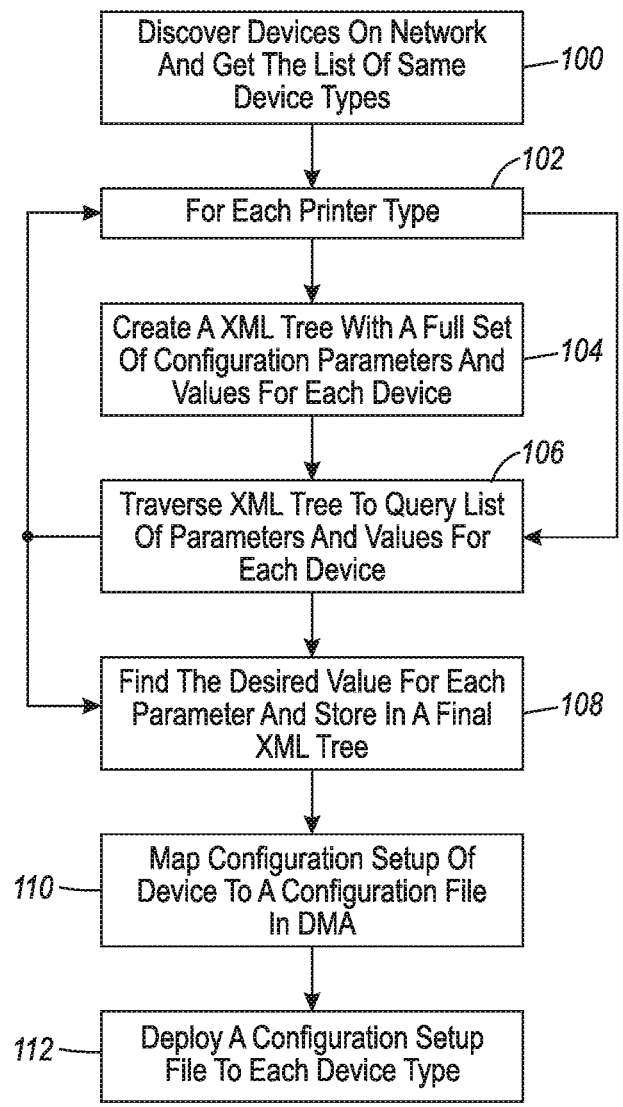
FIG. 1 is a flow diagram of various methods herein.

As mentioned above, device management application (DMA) provide many useful features, such as cloning; which is a procedure by which settings on one printer can be replicated on one or more other printers. The settings are created and installed by the cloning components and stored in the Clone file and configuration data or clone-to-self is the full current set of configuration settings along with the factory default settings. Cloning provides the user the ability to set up new devices quickly, by applying current settings from the operating devices. System Administrators (SAs) can clone all current settings or can choose category groups to clone. For example, several printing devices provide a device cloning capability to configure a device based on the configuration of another device as long as two devices are in the same family and version. The clone file can be stored both locally on a device and also remotely on any server. Remote storage allows a system administrator (SA) to upload the clone file on demand such as, after a software upgrade that may overwrite the device's current settings. The clone files can be uploaded to other devices of the same model and software version.

Further, DMA, in general, provides the capabilities of proactive status monitoring, billing data collection, consumable monitoring, service activation, asset tracking, software upgrade, device configuration, device security, etc. For the device configuration, there are two main feature category groups. The category group 'Configuration Sets' feature enables a) centralized asset management, b) security, protocol and canned services options. The category group 'Configuration Tasks' feature enables a) application of those settings created in 'Configuration sets' feature on a scheduled bases, and b) detailed logs of the applied settings. The DMA also has a wizards tab that allows an SA to perform a number of actions including uploading a printer's clone file to the server and deploying it to other devices. This printer clone feature can be used to deploy a clone file to a single printer or an entire fleet of printers. The deployment can be scheduled so it can be run during down times so it does not affect any user's printing. It also has extensive feedback on the results of the cloning process so the SA can determine if the clone file was successfully deployed.

A DMA that manages devices can have more than 1400 configuration parameters. A typical device also has more than 1000 configuration parameters. It is difficult to identify the parameters that have to be changed and their new settings so as to become consistent with a user's fleet of devices. There are often dependencies among the parameters and they must be set in a consistent way. These decisions are typically based on the SA's intuition and/or a few exploratory experiments. Finding the correct configuration parameters for a specific device is often time consuming and error prone task even for the experienced SA. The current cloning capability in certain devices somewhat provide the ability to set up new devices quickly, by applying the current settings from operating devices. However, the deployment of configuration settings to a new device or devices is limited to the same family and the version of the operating device.

In view of these issues, the system and methods herein provide the ability to automate the generation of the current settings of the device that DMA manages from the historical fleet current settings. The systems and methods also provide a method to configure a printing device that may not be in the same family and also version of existing devices. The systems and methods use eXtensible Markup Language (XML), as a common format that allows common configuration settings to be identified between devices. For example, XML schema and XML tree structure can be used and in an XML tree, the structure refers to the elements or the tags of configuration parameters, which are used to structure the content. The content represents the setting value or attribute of each parameter and those that can be stored in leaf nodes. The dependency of each setting to the other can be easily represented in an XML tree structure. Once the systems and methods have an XML tree structure of configuration settings for each device and the DMA, the methods can perform a query on the XML and search for the specific settings.

Referring to FIG. 1, the automatic device configuration setup generation process provides a general overview of the flow that defines the common data format of configuration setup file for device and DMA, and begins in item 100 where devices on the network are discovered, and a list of the same device types is generated. Thus, in item 100, methods and systems herein contact printing devices connected to a computer network using the DMA to obtain the device type (e.g., model name and number), configuration parameters, and configuration settings from the printing devices. These methods store the device type, the configuration parameters, and the configuration settings for each of the printing devices in a nested hash table.

Further, here the methods and systems query the list of parameters and find the distribution of configuration settings for each of the configuration parameters in each device group, and identify the preferred configuration setting for each configuration parameter of a particular device. A preferred configuration parameter may be the mode of the configuration parameter distribution, i.e., the setting that is most common for that configuration parameter. Therefore, for each printer type (beginning loop at item 102) an XML tree is created with a full set of configuration parameters and distribution of settings for each device (item 104). Thus, in item 104, the distribution of configuration settings are grouped for each of the printing devices by device type in a working file, such as an XML tree that has leaf nodes for each configuration parameter of each different device type group.

In other words, a different XML tree can be created for each type of device, such that each different XML tree stores data about only a single type of printing device. Thus, the leaves of each XML tree stores distributions parameter settings from many different devices, each of which is the same type. Regarding device "type," machines are considered to be of the same type if they are manufactured by the same company, have the same model number, have the same model name, and/or have the same version operating system, etc.; and machines are of different types if they are manufactured by different companies, have different model numbers, have different model names, and/or have different operating systems, etc.

In item 106, the XML tree or trees are traversed to query the list of parameters and setting values; and, in item 108, the desired value for each parameter is found and stored in a final XML tree. Therefore, in item 108, these methods identify the most common configuration settings for each of the configuration parameters in the leaf nodes. The most common configuration setting can be the setting for a configuration parameter that occurs most often, relative to other settings for the configuration parameter within each the device type group; or one that has been changed to from a different setting most often, relative to other settings for the configuration parameter within each the device type group.

This allows these methods, in item 110, to map the desired or final configuration setup to a configuration setup in DMA for each device group. Therefore, in item 110, this mapping process can include creating a device-specific XML tree that has leaf nodes for each configuration parameter of a specific printing device, and comparing the device-specific XML tree to the DMA generated XML tree to identify common configuration parameters and uncommon configuration parameter. These methods use the common configuration parameters for the configuration setup file specific to the specific printing device. Such processing deploys the desired or final configuration setup file to the selected device group in item 112.

More specifically, the data representation of configuration setup for the DMA and the device needs to be common and transferrable. For the structure and the content of the configuration parameters, the methods use the configuration setup file using XML schema. The content of XML data refers to the values of configuration parameters and the structure refers to the elements or the tags of configuration settings that are used to structure the content. The system and methods represent a configuration XML document as a hierarchical tree whose "nodes" are the tags of configuration settings exhibiting relationships of parent and child with other tags. Each element can have one or more children and, with the exception of the root element, has exactly one parent element. The tree is anchored by a root element, which is the only element in the tree without a parent. The "leaf" nodes of the tree contain the values of configuration attributes or empty elements. This tree based XML is used when the systems and methods compare the XML configuration from one device against the other XML file from another device or DMA.

When the configuration dataset is represented as XML tree, various programs such as XPath can be used to select nodes and find the information in an XML document. The XPath language is based on a tree representation of the XML document, and provides the ability to navigate around the tree, selecting nodes by a variety of criteria. Some examples of cloning configuration data files are shown in Tables 1 and 2. Table 1 describes the portion of configuration category, group and subgroup data in XML format, as shown below.

TABLE 1

```
<CATEGORY>
  <CATEGORY_NAME>
    GENERAL_CATEGORY
  </CATEGORY_NAME>
  <TOKEN>
    3414
  </TOKEN>
  <ICON>
    /images/gen8/general_settings_32.png
  </ICON>
  <GROUP>
    ADM_GROUP
    SECURITY_GROUP
    FEATURE_INST_KEYS_GROUP
    JOB_MANAGEMENT_GROUP
    PAPER_MANAGEMENT_GROUP
    SMART_ESOLUTIONS_GROUP
    INTERNATIONALIZATION_GROUP
    POWER_SAVER_GROUP
    WEB_SERVICES_GROUP
  </GROUP>
</CATEGORY>
<GROUP>
  <GROUP_NAME>
    ADM_GROUP
  </GROUP_NAME>
  </TOKEN>
    451
  <DETAIL_TOKEN>
    5543, 8694, 5534, 3135, 1238, 294, 1762, 2363, 14641,
    14416, 3703, 13337
  </DETAIL_TOKEN>
  <PRECONDITION>
  <SUBGROUP>
    SNMP_TRAP_REG_ATTR
    LUI_SETTINGS
    LUINVM_SETTINGS
    LUI_TOOLS
    WUI_SETTINGS
    SNMP_ATTRIBUTES
    SMTP_ATTRIBUTES
    SWUPGRADE_ATTRIBUTES
    ALERTS_ATTRIBUTES
  </SUBGROUP>
</GROUP>
<SUBGROUP>
  <SUBGROUP_NAME>
    SNMP_ATTRIBUTES
  </SUBGROUP_NAME>
  <MISC>
    <SNMPSettings>
  </MISC>
</SUBGROUP>
```

Table 2 shows an example of information stored in leaf node/attributes in an XML tree, which in this example is of the 'SNMPSettings' leaf node, as shown below.

TABLE 2

```
#version=1.1.003
connectivity.SNMP.v1v2cEnabled
connectivity.SNMP.v3Enabled
connectivity.SNMP.v3AdminAccountEnabled
connectivity.SNMP.v3AdminAuthPass
connectivity.SNMP.v3AdminPrivPass
connectivity.SNMP.readCommunityString
connectivity.SNMP.writeCommunityString
connectivity.SNMP.trapCommunityString
connectivity.SNMP.v3DriversAccountEnabled
connectivity.SNMP.v1v2cSetEnabled
connectivity.SNMP.v3AdminAccountName
connectivity.SNMP.v3DriversAccountName
connectivity.SNMP.v3DriversAuthPass
connectivity.SNMP.v3DriversPrivPass
connectivity.SNMP.v3EncryptionType
connectivity.SNMP.v3cSetEnabled
```

As described above, in item 100, the methods and systems herein discover devices on a network and group them by the same device type or model in the DMS. Specifically, various different DMAs are installed on a server to manage devices such as printers or multi-function devices in web based environment. Such applications allow users to discover devices and collect data from the device on a scheduled basis and display information via a network discovery protocol. Among collected data, type, model and firmware version of the device are stored in the database. The list of devices with the same device type and firmware version can be grouped together in item 100 to produce a master configuration file for the group. A SA may need to have the same configuration settings of devices by specific geographical locations or buildings. In this case, the grouping can be further customized by the location of the device. The grouping can be further extended to a family of printers or even manufacturer.

As noted above in item 106, for each printer in the same device group, the list of configuration parameters can be queried from the XML tree and can be stored in any data structure. The systems and methods provide a way to utilize a nested hash table to store parameters and setting values in item 100. If the incoming parameter is a new one, it can be stored in a hash table. Each parameter is a key to the hash table. The second hash table can be used to store the value of the first hash table. The key to this second hash table is settings of each parameter and the value is the count of each setting for the corresponding parameter. If a new setting is found for a given parameter, a new key and value pair is created in the second hash table. The process continues until all parameters in configuration settings for a specific group is exhausted. From this hash table, the systems and methods can easily find the most frequent setting (the highest count value) for a given parameter in item 108. For each group, the desired parameters and values are selected based on the configuration settings of all devices. The system and methods can finally put the final parameters and values in an XML tree, as shown in item 104. Table 3 shows the method flow diagram of generating nested hash table for configuration parameters and values for a given group of devices.

TABLE 3

Figure 2:
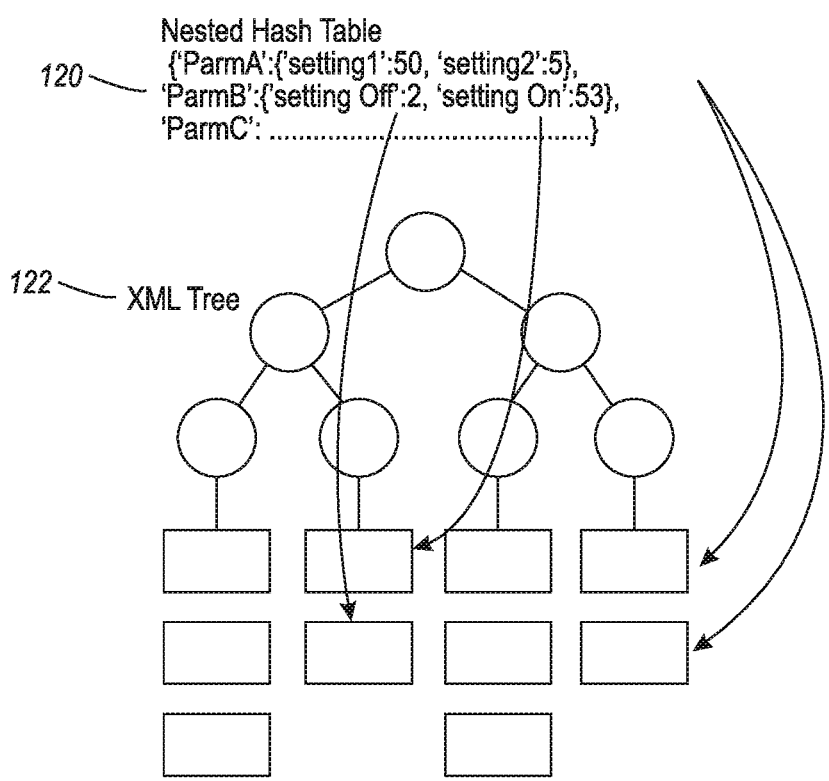
FIG. 2 is a schematic representation of information transfer from a nested hash table to an XML tree.

For each device type, query list of parameters and store in a
Nested Hash Table
   Create a Nested Hashtable
      For each parameter
         If parameter is existing one
         (HM: key already exists)
            If new setting found
               create key/value pair in Hashtable B
               store setting as key and value as 1
               ex) A{'Parameter':B{'settings1',count}}
            Else If setting value is existing one
               increase count of setting by one.
               ex) A{'Parameter':B{'settings1',count1, 'setting2':count2}}
         Else If parameter is new
            create key/value pair in Hashtable A
            store parameters name as key and value as setting
            create key/value pair in Hashtable B
            store setting as key and value as 1
            ex) {'ParmA':{'setting1':50, 'setting2':5},
                'ParmB':{'settingOff':2, 'settingOn':53},
                'ParmC: ......................................}
Return to Hashtable After the systems and methods store the configuration parameters and setting values in a nested hash table in item 100, the next step is to put each parameter and setting values in an XML tree as shown in FIG. 1, item 104. This is also shown in FIG. 2 where information in the nested hash table 120 is transferred to the leaves of the XML tree 122. The systems and methods can find the parameters and the desired setting values (most frequent setting value) for a given group of devices from the hash table. A method diagram to store the information from the returned hash table to an XML tree is shown in Table 4. The schematic representation of this step is shown in Table 4, as seen below.

TABLE 4

Find the desired parameters and values from the returned Hashtable
   For each parameter in Hashtable
      Find parameter in XML tree
      Put each parameter and setting values in XML tree leaf node
      Find the most frequent setting in Hashtable In addition to tracking the most frequent current setting in item 108, the methods can also look at historical change in setting value for a given parameter. One way for the device management system to get historical changes in configuration setting value is to use logging data stored on the server or in the device. For example, the DMA uses an Event Viewer Logs to store all changes that are made to all devices. These logs can be searched to determine, for a given parameter and printer family, what the most frequent resultant value for a given parameter. For another example, the DMA can read the settings history logs from the device and determine the most frequent transitioned-to value in a device. The nested hash table 120 in FIG. 2 can be used to track the most frequently transitioned value. For example, there are more than two setting values for a parameter. If any group of product may be changed (value from A to B), while another group of product may be changed (values from C to B). This kind of information can be helpful to understand the usage pattern of certain group of devices or customers. Keeping the final value, both groups will end up having B value. Maintaining the transition count in table 120 is useful for when a fleet of printers are first deployed. Typically, the printers may be deployed all with a common set of values. During the install phase, the printers go through a period where they are assessed in a "pilot" environment. The printers then are deployed in a larger quantity throughout an organization. During these periods, the parameters on these devices may be adjusted individually, on a printer by printer basis. Tracking and accounting for these adjustments can give the system administrator an accurate idea as to what the deployed parameters need to be changed and what value should be set.

Figure 4:
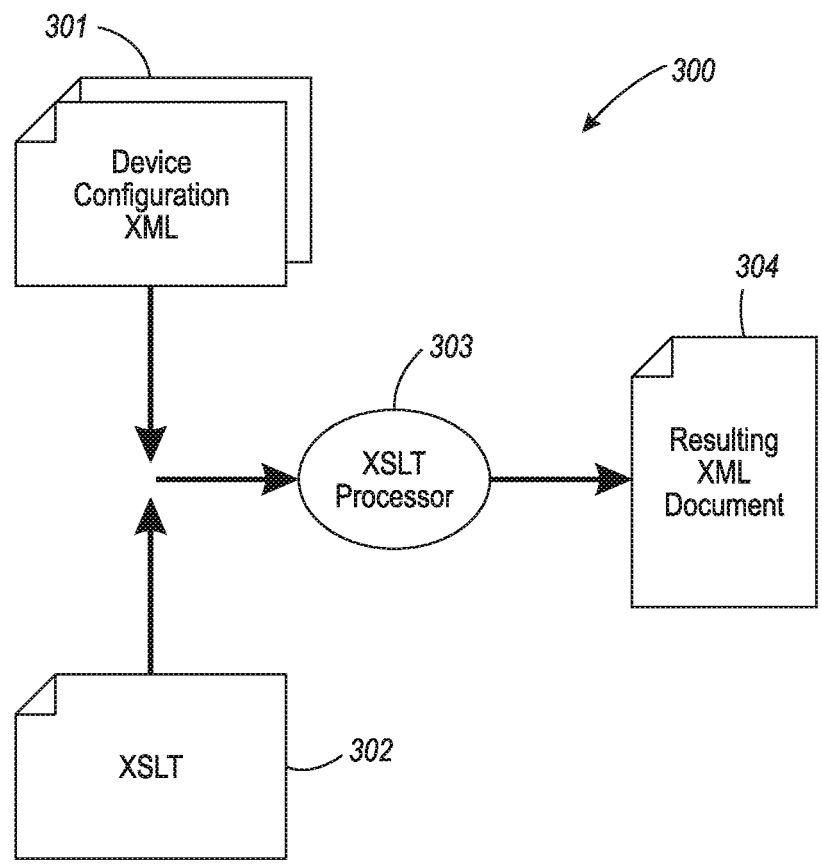
FIG. 4 is a schematic illustration showing a diagram of this transformation process into an XML document.

As noted above, in item 110, the desired configuration XML setup file created in item 104 is mapped to a configuration setup in the DMA for each device group. Thus, there are two XML files; one created from a device and the other created from configuration settings in DMA for each device group. Firstly, these methods read these two XML files and create the final set up XML file with all possible parameters. This file is the Device Definition File (DDF). Secondly, these methods can find the common parameters between two XMLs. This can be done, for example, using Extensible Stylesheet Language Transformations (XSLT) or other methods that are available. The capability of XSLT to transform XML documents into final desirable format is useful in DMA environment. The process of transforming an XML document into another format relies on two types of processing engines. A simple diagram 300 of this transformation process is shown in FIG. 4. First, a parser capable of loading an XML document must be present to load the source document into a DOM tree structure 301. Next, the XSLT document 302 is loaded, and a tree structure is created for it, as well. This tree structure is optimized to accommodate XSLT processing and is specific to the processor being used. An XSLT processor 303 is then used to take the XML document structure, match up nodes within the document against "templates" found in the XSLT document, and then output the resulting document. The third tree structure (the resulting document, 304) is dynamically created based on information contained in the XSLT document.

Simple examples of XSLT transformation using XSLT template are shown below in Tables 5, 6, and 7. When the transformation is applied on the provided XML document in Table 6 using XSLT template in Table 5, the resulting XML document Table 7 is produced.

Figure 3:
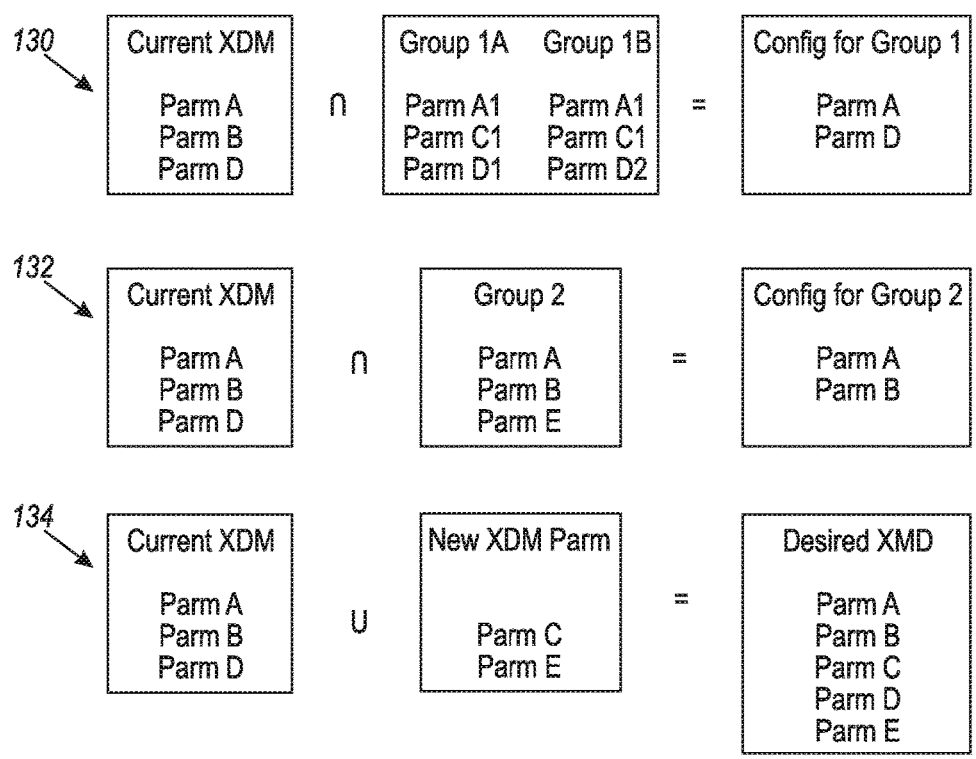
FIG. 3 is a schematic illustration showing a selection process of configuration setup in DMS for each device group.

The systems and methods herein are able to create the list of available parameters in two XML files and find out the set of common parameters and the set of uncommon parameters. The set of common parameters are used for generating the desired configuration file in the device management system (DMS) for a given group of devices. For example, in FIG. 3, series 130 shows that the common parameters from a device (Current XDM tree parameters A, B, D) and from the DMA (Group 1A, 1B: parameter A, C, D) is the Config. for Group 1, which is only the common parameters A and D. Similarly, series 132 shows that the common parameters from a device (Current XDM tree parameters A, B, D) and from the DMA (Group 2: parameter A, B, E) is the Config for Group 2, which is only the common parameters A and B. The set of uncommon parameters can be stored in the database in DMA with the device type name. For example, in FIG. 3, series 134 shows that the uncommon parameters from a device (Current XDM tree parameters A, B, D) and from the New XDM parameters (parameter C, E) is the desired XDM, which is the uncommon (non-overlapping) parameters A-E.

In various device management systems, there are different ways to deploy the desired configuration set up file to the selected device group in item 112. Firstly, the methods can deploy the desired configuration set up file described in previous sections to the selected device group by uploading the configuration file and deploying directly to the group of devices using a 'Clone Printer' feature. Secondly, the methods can apply a desired configuration file created using 'Configuration Set' feature to the group of device selected. The 'Configuration Set' feature can be also used to make changes to the settings for a desired configuration file. The mapped settings and values of the desired configuration file when viewed can provide an end user that ability to change the values for parameters supported for a device. Any parameters the family of devices does not support will not be selectable for the end user to prevent the desired file from having invalid device settings. The systems and methods herein are able to determine what parameters are allowed by using a clone file that provides all of the parameters that is supported and furthermore can check this master list when end users decide to add additional parameters to a desired configuration file that was created with only a sub set of device features such as just the Scan or Security settings.

In a specific implementation example, a user creates a clone file on the device selecting all features and uploads the file to DMS. Then the user creates a 'Config Set' from the XML format of the clone file. Then, the 'Config Set' is displayed on the device GUI, with the option to enable all features the device supports, or the values the device has for those features are filled in. Any changes can be made by the user, and the user can modify any values or alternately the user can only remove or re-add back into the 'Config Set' features of the clone file. Finally the user selects 'Save' and this creates the desired file.

In another example, if the clone file with the subset of features and the DMA already has all features for that device mapped previously, the workflow is slightly different. Firstly the user creates a clone file on the device with just scan features, then uploads the file to the DMA. The user then creates a 'Config Set' from the XML format of the clone file. The 'Config Set' is displayed on the device GUI, and this shows two options where either the scan features from the device are enabled or the values for scan are filled in. Following this, changes can be made by the user such as modifying any values, adding other features from the full mapping only, or the user can only remove or re-add back into the 'Config Set' features of the clone file. Finally saving will create the desired file.

TABLE 5

```
<xsl:stylesheet versions="1.0"
    xmlns:xsl="http://www.w3.org/1999/XSL/Transform"
    xmlns:ext="http://exslt.org/common" exclude-result-refixes="ext">
<xsl:output omit-xml-declaration="yes" ident="yes"/>
<xsl:strip-space elements="*"/>
<xsl:param name="pUncertainElName" select="'second'"/>
<xsl:param name="pOrderedNames" select="'first|second|third|'"/>
<xsl:template match="node( )|@*">
    <xsl:copy>
      <xsl:apply-templates select="node( )|@*"/>
    </xsl:copy>
<xsl:template>
<xsl:template mattch="innerElement">
    <xsl:variable name="vrtfFirstPass">
        <xsl:copy>
          <xsl:apply-templates select="node( )|@*"/>
          <xsl:apply-templates select=
            "self::*[not(*[name( ) = $pUncertainElName])
                or
                *[name( )=$pUncertainElName and @missing-cause]]"
            mode="missing"/>
        <xsl:copy>
    <xsl:variable>
    <xsl:apply-templates select="ext:node-set($vrtfFirstPass)/*"
      mode="pass2"/>
<xsl:template>
<xsl:template match="*[@missing-cause]"/>
    <xsl:template match="*" mode="missing">
        <xsl:element name="{$pUncertainElName}">
            <CharacterString>INSERTED BY
            TEMPLATE</CharacterString>
        <xsl:element>
<xsl:template>
<xsl:template match="innerElement" mode="pass2">
    <xsl:copy>
      <xsl:apply-templates>
        <xsl:sort data-type="number" select=
        "string-length(substring-before($pOrderedNames,
                concat('|', name( ), '|')
                )
         )"/>
      <xsl:apply-templates>
      <xsl:copy>
<xsl:template>
<xsl:stylesheet>
```

TABLE 6

```
<doc>
    <outerElement>
        <innerElement>
            <first>
                <textElement>Some Text</textElement>
            </first>
            <second missing-cause="bla" />
```

TABLE 6-continued

```
      <third>
         <textElement>Some Text</textElement>
      </third>
     </innerElement>
   </outerElement>
</doc>
```

TABLE 7

```
<doc>
   <outerElement>
     <innerElement>
       <first>
          <textElement>Some Text</textElement>
       </first>
       <second>
          <CharacterString>INSERTED BY
          TEMPLATE</CharacterString>
       </second>
       <third>
          <textElement>Some Text</textElement>
       </third>
     </innerElement>
   </outerElement>
/doc>
```

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to create an XML tree from a hash table, as performed by the methods and devices discussed herein, the manual process would be sufficiently inaccurate and take an excessive amount of time so as to render the manual classification results useless. Specifically, processes such as receiving electronic data streams, creating hash tables, creating XML trees, electronically storing revised data, etc., requires the utilization of different specialized machines, and humans performing such processing would not produce useful results because of the time lag, inconsistency, and inaccuracy humans would introduce into the results.

Further, such machine-only processes are not mere "post-solution activity" because the methods utilize machines at each step, and cannot be performed without machines. For example, the method steps require the DMA to use a network to obtain data from the various networked printing devices, and uses a computer to create the hash table, XML tree, and configuration files. In other words, these various machines are integral with the methods herein because the methods cannot be performed without the machines (and cannot be performed by humans alone).

Additionally, the methods herein solve many highly complex technological problems. For example, as mentioned above, a typical device has more than 1000 configuration parameters, and it is difficult to identify the parameters that have to be changed and their new settings so as to become consistent with a user's fleet of devices, and such decisions are typically based on the SA's intuition and/or a few exploratory experiments. Finding the correct configuration parameters for a specific device is often time consuming and error prone task even for the experienced SA. Methods herein solve this technological problem by utilizing the DMA to automatically create a hash table, XML tree, configure file, etc. without requiring the laborious and inaccurate actions of the technical engineer.

As mentioned above, the methods and devices herein greatly simplify the operation from the user's viewpoint by reducing the number of interactions with the user interface, which decreases the amount of time needed to perform the operations described herein, etc. This, in turn, reduces the amount of time that the user interface is on (thereby saving power) and also reduces the load on all processing components (e.g., reduces load on the scanner, by potentially avoiding the pre-scan operation; reduces load on the processor, by avoiding calculating the estimated dimensions; etc.). Thus, the methods herein reduce the amount and complexity of hardware and software needed to be purchased, installed, and maintained, thereby solving a substantial technological problem that providers experience today.

By granting such benefits to providers, the methods herein reduce the amount and complexity of hardware and software needed to be purchased, installed, and maintained by providers, thereby solving a substantial technological problem that providers experience today.

Figure 5:
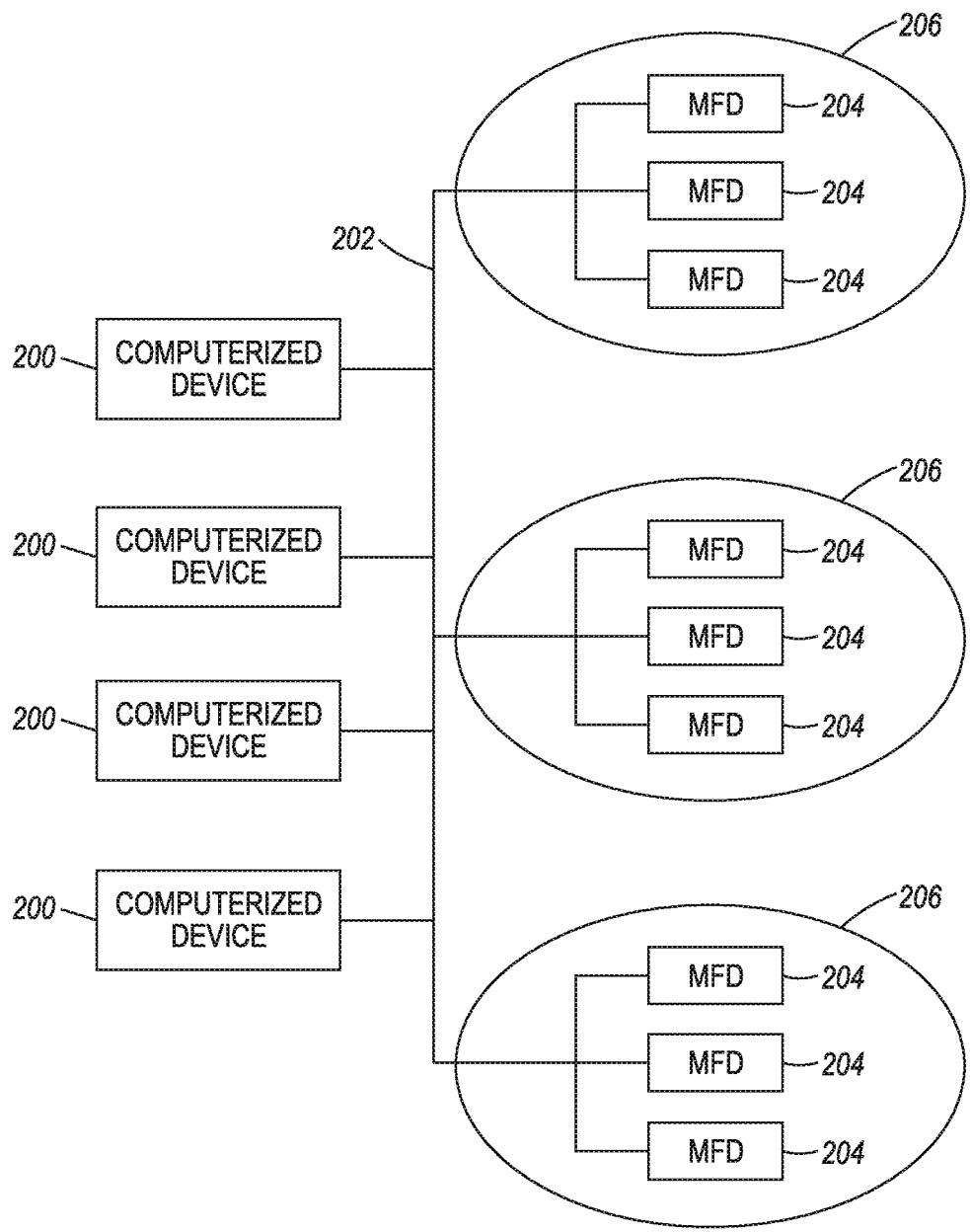
FIG. 5 is a schematic diagram illustrating systems herein.

As shown in FIG. 5, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 6:
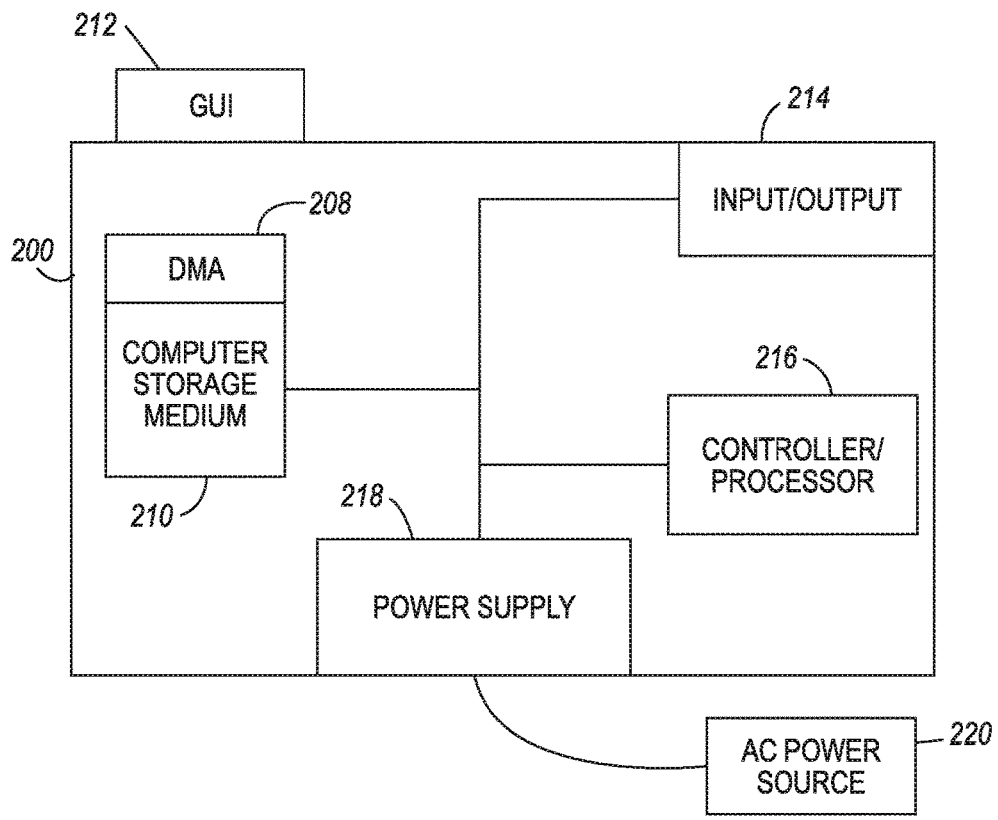
FIG. 6 is a schematic diagram illustrating devices herein.

FIG. 6 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 5, a body housing has one or more functional components that operate on power supplied from an alternating current (AC) source 220 by the power supply 218. The power supply 218 can comprise a common power conversion unit, power storage element (e.g., a battery, etc), etc.

Figure 7:
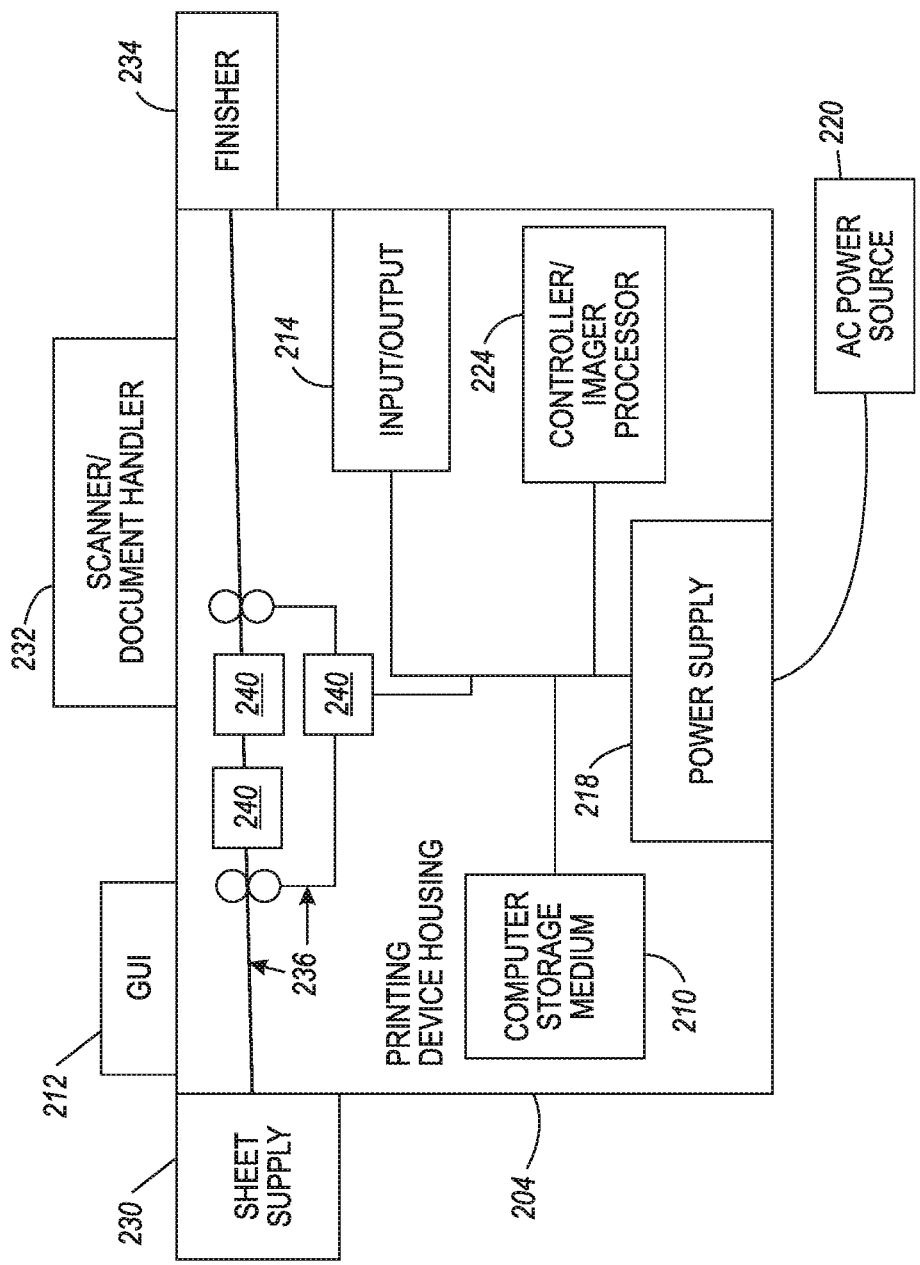
FIG. 7 is a schematic diagram illustrating devices herein.

FIG. 7 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, as shown above, various systems herein include (among other components) printing devices 204 and a computerized device 200 connected to a computer network 202. The computerized device 200 can include a memory device 210, and a device management application (DMA 208) can be operating on the computerized device 200.

The DMA 208 contacts the printing devices 204 connected to the computer network 202 to obtain the device type, configuration parameters, and configuration settings of the configuration parameters from the printing devices 204. The DMA 208 stores the device type, the configuration parameters, and the configuration settings for each of the printing devices 204 in a nested hash table in the memory device 210 of the computerized device 200. The DMA 208 groups the configuration settings for each of the printing devices 204 by the device type in an extensible markup language (XML) tree that has leaf nodes for each configuration parameter of each different device type group.

The DMA 208 identifies the most common configuration settings for each of the configuration parameters in the leaf nodes. The most common configuration setting is the setting for a configuration parameter that occurs most often, relative to other settings for the configuration parameter within each the device type group; or one that has been changed to from a different setting most often, relative to other settings for the configuration parameter within each the device type group.

The DMA 208 maps the most common configuration settings for the configuration parameters to configuration setup files for each the device type group by creating a device-specific XML tree that has leaf nodes for each configuration parameter of a specific printing device; and comparing the device-specific XML tree to the XML tree to produce common configuration parameters and uncommon configuration parameter. The common configuration parameters are used for a configuration setup file specific to device types matching the specific printing device.

Also, user input can be received to modify the configuration setup files. The DMA 208 deploys the configuration setup files to the printing devices 204 (e.g., by resetting configuration settings of the printing devices 204 to match configuration settings in the configuration setup files, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

The invention claimed is:
1. A method comprising:
contacting printing devices connected to a computer network using a device management application (DMA) operating on a computerized device to obtain a device type, configuration parameters, and configuration settings of said configuration parameters from said printing devices;

storing said device type, said configuration parameters, and said configuration settings for each of said printing devices in a storage file in a memory device of said computerized device;

grouping said configuration settings by said device type to create device type groups of configuration settings in a working file;

identifying most common configuration settings for each of said configuration parameters for each of said device type groups of configuration settings in said working file;

mapping said most common configuration settings for said configuration parameters to configuration setup files for said printing devices within each said device type; and deploying said configuration setup files to said printing devices.

2. The method according to claim 1, said most common configuration settings comprise a setting for a configuration parameter that occurs most often, relative to other settings for said configuration parameter within each of said device type groups of configuration settings.

3. The method according to claim 1, said most common configuration settings comprise a setting for a configuration parameter that has been changed to from a different setting most often, relative to other settings for said configuration parameter within each of said device type groups of configuration settings.

4. The method according to claim 1, said mapping comprising:

creating a device-specific XML tree that has leaf nodes for each configuration parameter of a specific printing device;

comparing said device-specific XML tree to said working file to produce common configuration parameters and uncommon configuration parameter; and using said common configuration parameters for a configuration setup file specific to device types matching said specific printing device.

5. The method according to claim 1, further comprising receiving user input to modify said configuration setup files.

6. The method according to claim 1, said deploying comprising resetting configuration settings of said printing devices to match configuration settings in said configuration setup files.

7. The method according to claim 1, said device type comprising a model name, a model number and a firmware version.

8. A method comprising:

contacting printing devices connected to a computer network using a device management application (DMA) operating on a computerized device to obtain a device type, configuration parameters, and configuration settings of said configuration parameters from said printing devices;

storing said device type, said configuration parameters, and said configuration settings for each of said printing devices in a nested hash table in a memory device of said computerized device;

grouping said configuration settings by said device type in an extensible markup language (XML) tree that has leaf nodes for each configuration parameter of each different device type group of configuration settings;

identifying most common configuration settings for each of said configuration parameters in said leaf nodes;

mapping said most common configuration settings for said configuration parameters to configuration setup files for said printing devices within each said device type; and deploying said configuration setup files to said printing devices.

9. The method according to claim 8, said most common configuration settings comprise a setting for a configuration parameter that occurs most often, relative to other settings for said configuration parameter within each said device type group of configuration settings.

10. The method according to claim 8, said most common configuration settings comprise a setting for a configuration parameter that has been changed to from a different setting most often, relative to other settings for said configuration parameter within each said device type group of configuration settings.

11. The method according to claim 8, said mapping comprising:

creating a device-specific XML tree that has leaf nodes for each configuration parameter of a specific printing device;

comparing said device-specific XML tree to said XML tree to produce common configuration parameters and uncommon configuration parameter; and using said common configuration parameters for a configuration setup file specific to device types matching said specific printing device.

12. The method according to claim 8, further comprising receiving user input to modify said configuration setup files.

13. The method according to claim 8, said deploying comprising resetting configuration settings of said printing devices to match configuration settings in said configuration setup files.

14. The method according to claim 8, said device type comprising a model name and a model number.

15. A system comprising:

a computer network;

printing devices connected to said computer network;

a computerized device connected to said computer network, said computerized device having a memory device; and a device management application (DMA) operating on said computerized device, said DMA contacting said printing devices connected to said computer network to obtain a device type, configuration parameters, and configuration settings of said configuration parameters from said printing devices;

said DMA storing said device type, said configuration parameters, and said configuration settings for each of said printing devices in a nested hash table in said memory device of said computerized device;

said DMA grouping said configuration settings by said device type in an extensible markup language (XML) tree that has leaf nodes for each configuration parameter of each different device type group of configuration settings;

said DMA identifying most common configuration settings for each of said configuration parameters in said leaf nodes;

said DMA mapping said most common configuration settings for said configuration parameters to configuration setup files for said printing devices within each said device type; and said DMA deploying said configuration setup files to said printing devices.

16. The system according to claim 15, said most common configuration settings comprise a setting for a configuration parameter that occurs most often, relative to other settings for said configuration parameter within each said device type group of configuration settings.

17. The system according to claim 15, said most common configuration settings comprise a setting for a configuration parameter that has been changed to from a different setting most often, relative to other settings for said configuration parameter within each said device type group of configuration settings.

18. The system according to claim 15, said mapping comprising:
- creating a device-specific XML tree that has leaf nodes for each configuration parameter of a specific printing device;
- comparing said device-specific XML tree to said XML tree to produce common configuration parameters and uncommon configuration parameter; and
- using said common configuration parameters for a configuration setup file specific to device types matching said specific printing device.

19. The system according to claim 15, further comprising receiving user input to modify said configuration setup files.

20. The system according to claim 15, said deploying comprising resetting configuration settings of said printing devices to match configuration settings in said configuration setup files.

\* \* \* \* \*